(12) United States Patent
Callender

(10) Patent No.: US 7,392,527 B2
(45) Date of Patent: Jun. 24, 2008

(54) DRIVER-SPECIFIC CONTEXT FOR KERNEL-MODE SHIMMING

(75) Inventor: Robin Lynn Callender, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 974 days.

(21) Appl. No.: 10/732,746

(22) Filed: Dec. 10, 2003

(65) Prior Publication Data

US 2005/0149947 A1 Jul. 7, 2005

(51) Int. Cl.
*G06F 3/00* (2006.01)
*G06F 9/44* (2006.01)
*G06F 9/46* (2006.01)
*G06F 13/00* (2006.01)

(52) U.S. Cl. ............... 719/327; 703/25; 703/26

(58) Field of Classification Search ............. 719/328, 719/321, 327
See application file for complete search history.

(56) References Cited

U.S. PATENT DOCUMENTS

| | | | |
|---|---|---|---|
| 5,335,346 A | 8/1994 | Fabbio | |
| 5,390,301 A * | 2/1995 | Scherf | 719/321 |
| 6,230,118 B1 * | 5/2001 | Bader et al. | 703/24 |
| 6,289,464 B1 | 9/2001 | Wecker et al. | |
| 6,321,323 B1 * | 11/2001 | Nugroho et al. | 712/34 |
| 6,418,485 B1 * | 7/2002 | Cooper et al. | 719/321 |
| 6,449,660 B1 * | 9/2002 | Berg et al. | 710/1 |
| 6,505,300 B2 | 1/2003 | Chan | |
| 6,509,911 B1 | 1/2003 | Shimotono | |
| 6,538,773 B1 | 3/2003 | Brossman et al. | |
| 6,615,312 B1 * | 9/2003 | Hamlin et al. | 711/112 |
| 6,889,167 B2 * | 5/2005 | Curry, III | 702/183 |
| 2001/0044904 A1 * | 11/2001 | Berg et al. | 713/201 |
| 2003/0088711 A1 * | 5/2003 | Tabares et al. | 709/321 |
| 2003/0233487 A1 * | 12/2003 | Ruget et al. | 709/321 |
| 2004/0177361 A1 * | 9/2004 | Bernhard et al. | 719/321 |
| 2004/0216141 A1 * | 10/2004 | Shoji et al. | 719/321 |
| 2005/0050553 A1 * | 3/2005 | Hen et al. | 719/321 |

OTHER PUBLICATIONS

Konkin, D. P., Oster, G. M., and Bunt, R. B., "Exploiting software interfaces for performance measurement", 1998, ACM Press, Proceedings of the 1st international Workshop on Software and Performance , WOSP '98, pp. 208-218.*

Buddhikot, M., Hari, A., Singh, K., and Miller, S., "MobileNAT: a new technique for mobility across heterogeneous address spaces", Sep. 19, 2003, ACM Press, Proceedings of the 1st ACM international Workshop on Wireless Mobile Applications and Services on WLAN Hotspots, WMASH '03, pp. 75-84.*

* cited by examiner

*Primary Examiner*—William Thomson
*Assistant Examiner*—KimbleAnn Verdi
(74) *Attorney, Agent, or Firm*—Amin, Turocy & Calvin, LLP

(57) ABSTRACT

The kernel is a shared environment. Accordingly, many different kernel-mode drivers utilize services provided by the kernel. Furthermore, when shimming of drivers is necessary, it is desirable to support shim reuse amongst drivers with similar problems or issues, rather than generating a customized shim for each driver. To facilitate kernel-mode shimming and shim reuse, context information needs to be retrieved and maintained so that shims can identify particular driver calls and preserve driver specific linkage information. The present invention accomplishes the forgoing by employing an intermediate structure, a content component, between a client or driver call and a common shared shim to provide the shim with contextual information.

23 Claims, 11 Drawing Sheets

DRIVER-SPECIFIC CONTEXT FOR KERNEL-MODE SHIMMING

TECHNICAL FIELD

The present invention relates generally to computers and more particularly toward a system and method of shimming kernel-mode drivers.

BACKGROUND

Shimming is a technique that allows additional functionality to be inserted between an application programming interface (API) client (e.g., an application, driver) and an API service (e.g., supplied by an operating system). An API client application may be written to use a collection of externally provided services (APIs), which provide some well-described functionality. These API services reside external to the client program, for example, contained in a dynamically linked library (DLL).

One of the major benefits provided by external API services is that a client application can be built without including the API service code directly in the client application. In particular, such a scheme provides a way for applications to declare their usage of a particular API service, but defer binding to that API until the application is actually loaded for execution. This allows application code to be separated from the API service code and allows for modularity in the construction of the application run-time environment. External API services are said to be "imported" into client applications and have "load-time binding" to applications. Accordingly, an application declares its intent to use imported API services and in response, the compiler can implicitly generate a "stub" entry in the applications import address table (IAT). The IAT containing import stubs can be generated by the compiler. These IAT stubs identify the name of the import API and the external service or DLL that corresponds with the API. When the application is loaded or otherwise made ready for execution, load-time binding will be performed and the IAT stubs will be updated to reference the correct API services.

FIG. 1 illustrates a conventional system 100 for linking an application 110 and an API service provider 120. Application 110 comprises a code section 112 and an IAT 114. In the code section 112, there is a call to import a procedure, here Foo. IAT 114 contains a pointer to the address of the Foo procedure in the API service provider 120. Conventional user-mode application shimming techniques are based on manipulating the IAT table entries to effect the insertion of functionality. This can be accomplished by changing the imported API's entry in the application's IAT to point to shim code rather than the original API service code.

FIG. 2 illustrates a conventional user-mode utilization of a shim 130 between the application 110 and the API service provider 120. The shim 130 can be written to provide a "value added" benefit to the API service or it can completely replace the API service functionality and never call the original API service provider 120. User-mode applications run in a process which is essentially owned by the application. Accordingly, there is only one client, the application, in the process. This is not true for a system process where kernel-mode drivers execute. In a system process, API service providers, such as an operating system kernel, are called by a multitude of different and substantially unique drivers.

Turning briefly to FIG. 3, an exemplary system driver interaction is illustrated. Driver X 310 has code 312 which utilizes IAT 314 to import or link to Foo Procedure 332 operating system kernel 330. Driver Y 320 has code 322 that employs IAT 324 to import or link to VerifierFoo Procedure 334 in system kernel 330, which then calls Foo Procedure 332 also in the kernel 330. Both drivers were written to invoke Foo Procedure or API 332, but Driver X's linkage is different from that of Driver Y's linkage. Driver Y has had its Foo import shimmed by a built in shim, namely VerifierFoo, while Driver X is directly linked to the original Foo API in the kernel.

One important goal of shim developers is reusability. Thus, a good shim framework should support reuse of shims when possible. If a shim, which provides some extended service or fix is created then it is desirable that that shim be applied to all applications expressing the problem, for instance, that the shim was designed to correct. For example, if Shim X fixes problem X and applications A, B, and C have problem X, then it would be desirable to have Shim X be able to fix applications A, B, and C without any changes to Shim X. However, providing such a common shim has not been possible up to this point, due in part by the fact that different drivers often have different linkage configurations, such as Driver X and Driver Y supra. Moreover, conventional user-mode shims and shimming systems can retain only one linkage configuration, namely the most recent, while other linkage configurations associated with previously shimmed drivers is lost. Further complicating the problem is the fact that existing infrastructures for imported APIs or services do not readily provide any contextual information with respect to which driver is utilizing the API or service.

Accordingly, there is a need in the art for a shim system and method that can determine and maintain a plurality of linkage configurations, context, unique to each application or driver to be shimmed.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Disclosed herein is a system and method for establishing and maintaining driver unique contextual information so that common shims can be utilized to provide some service or fix a particular problem associated with a plurality of drivers or other similar applications. Unique context formation is injected into a shimming system via an intermediate context component residing between the driver and a shim component. The context component comprises a hook component and a thunk component. The hook component stores context information regarding a kernel procedure referenced by a driver and redirects the driver to the context component. The thunk component links the context component to the shim component and provides the shim component with driver unique context information. The shim can then perform its function and subsequently link or jump to the kernel procedure or service originally referenced by driver.

According to another aspect of the subject invention, a shimming system is disclosed herein that implements and supports driver unique context information. More particularly, the system comprises a shim engine component that receives a notification signal indicating when a driver is loaded. Upon receipt of the signal the shim engine can query a shim database to determine if any shim components or shim packages are associated with the loaded driver. Thereafter, the shim engine can load any associated shim components and generate or load a context component associated with the loaded driver. Additionally, the shimming system disclosed herein can include a diagnostic component that monitors a system and, upon a system crash or a detected instability or inefficiency, queries the shim database to determine if a shim component is available that if applied would fix or compensate for the problem causing the crash, instability or inefficiency. Further yet, the shimming system according to an aspect of the subject invention can employ an interface component to facilitate development, deployment, and management of shim components and packages by users or developers.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

The foregoing and other aspects of the invention will become apparent from the following detailed description and the appended drawings described in brief hereinafter.

DETAILED DESCRIPTION

The present invention is now described with reference to the annexed drawings, wherein like numerals refer to like elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope or spirit of the subject invention.

Figure 1:
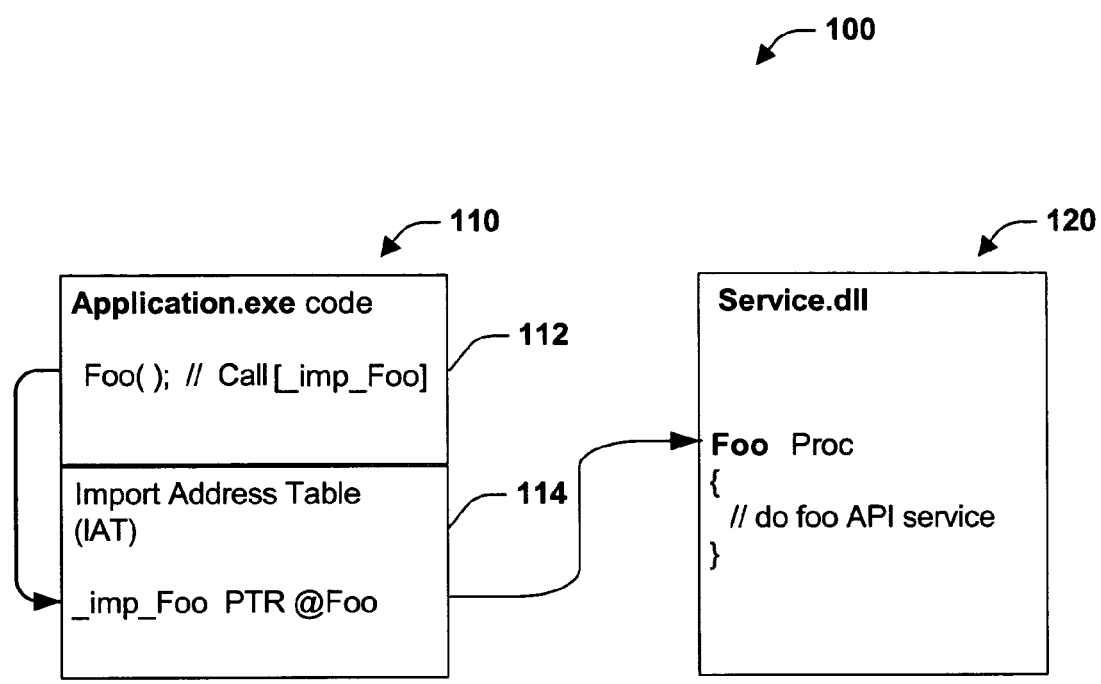
FIG. 1 is a block diagram of a system for linking an application to an application service provider.
Figure 2:
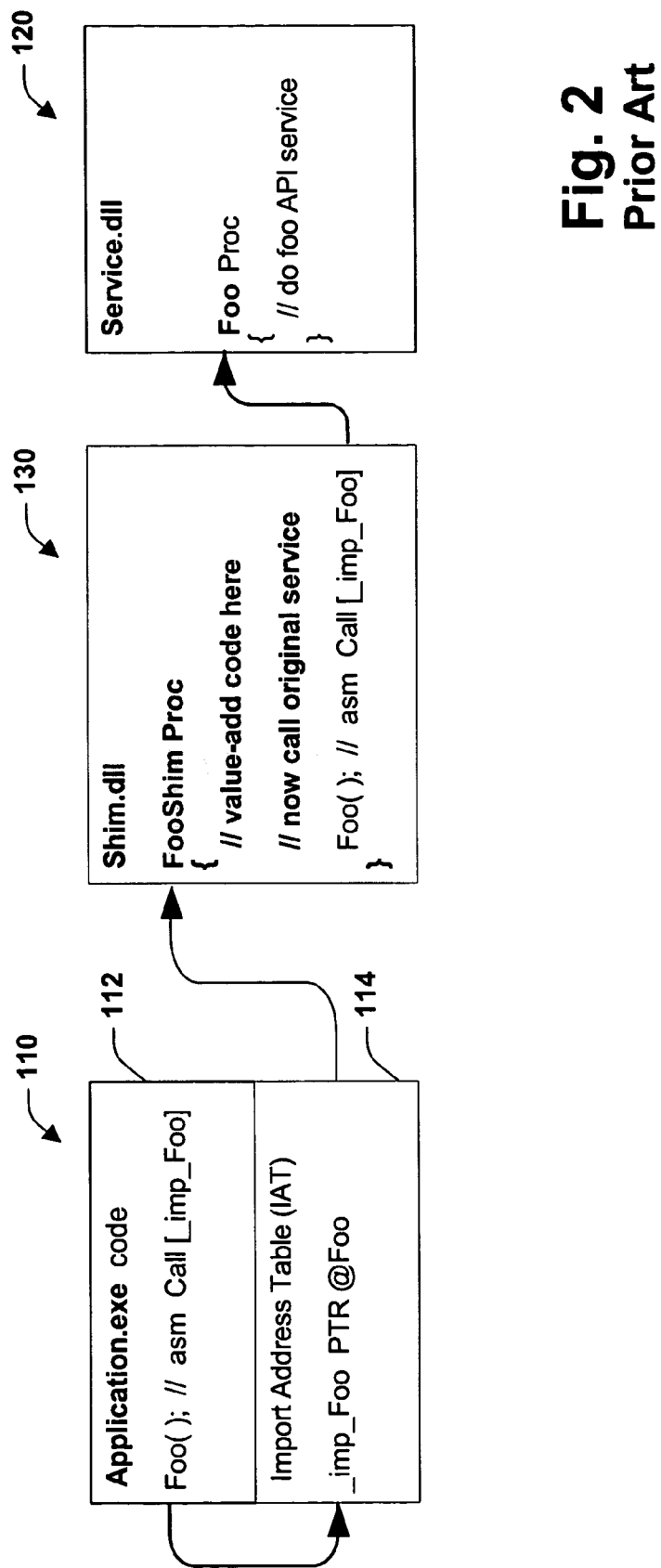
FIG. 2 is a block diagram illustrating a conventional shimming system.
Figure 3:
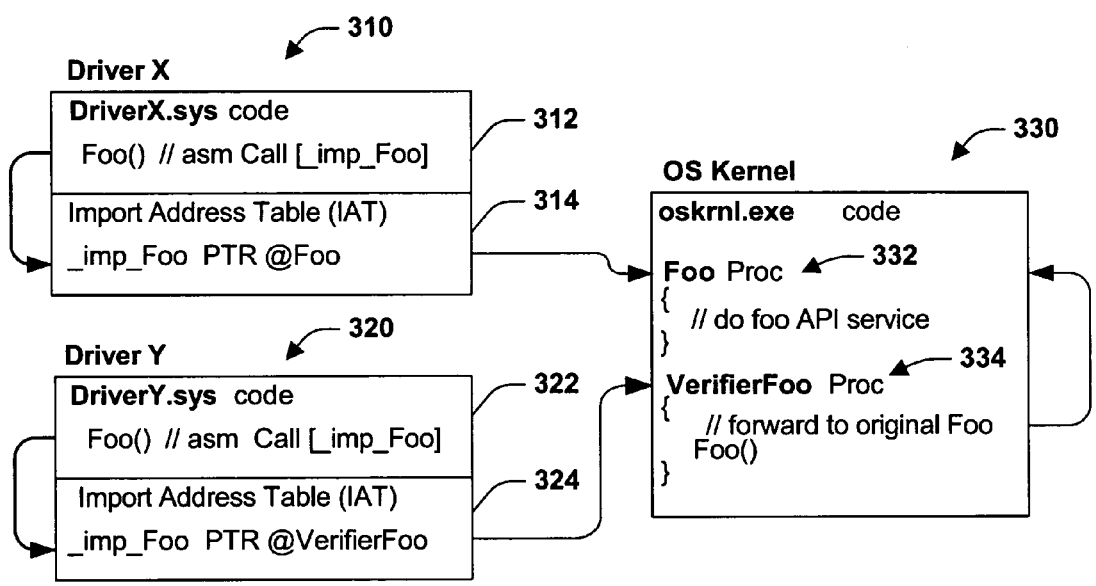
FIG. 3 is a block diagram depicting a system for interacting with a system kernel.
Figure 4:
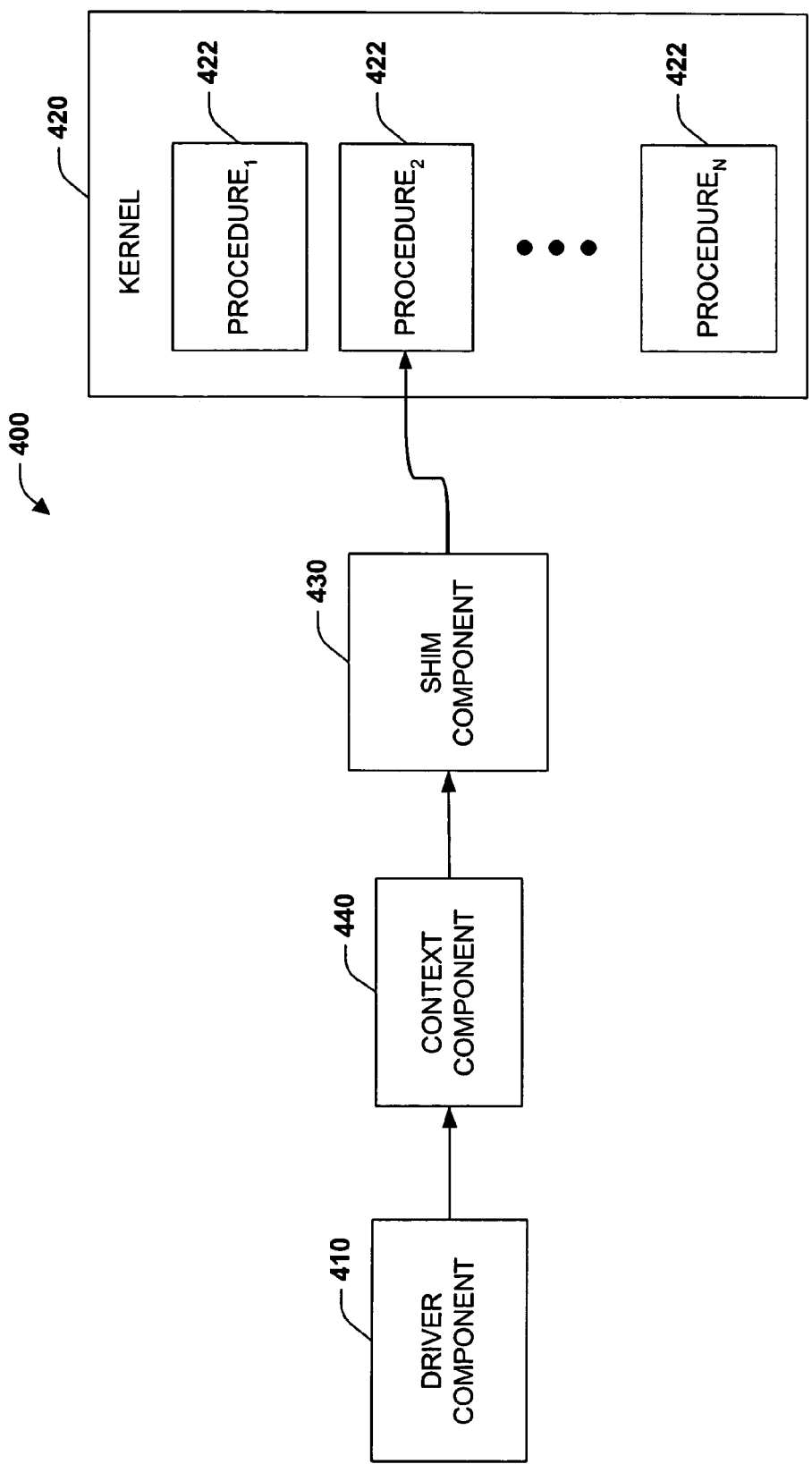
FIG. 4 is a block diagram illustrating a kernel-mode driver shimming system is illustrated in accordance with an aspect of the present invention.

Turning to FIG. 4, a shimming system 400 is illustrated in accordance with an aspect of the present invention. System 400 comprises driver component 410, kernel component 420, procedures 422 (Procedure$_1$, Procedure$_2$ through Procedure$_N$, where N is greater than one), context component 440 and shim component 430. Driver component 410 (also referred to herein as simply driver) can be used to perform almost any function on a computer however driver components are typically employed to provide an interface to a particular hardware device or piece of software. Driver component 410 can encapsulate special instructions and information associated with a particular device or piece of software and provide users (e.g., hardware, software) access to a set of generic instructions. Devices or software then utilized the generic commands to communicate with a device or software component. The driver component 410 can translate received generic instructions to the specialized instructions utilized by the device or software component. A driver component(s) can be provided by an operating system, by software applications, or via software associated with a particular device (e.g., disk drive, printer, scanner, keyboard, mouse, speakers . . . ). A driver component 410 can be implemented in computer systems as dynamically linked library (DLL) files. DLL files are small files that are utilized by a larger program or device to perform a specific function. For instance, a driver component or DLL file can provide support for a particular device such as a printer. The driver component or DLL file can then be utilized by a larger program like a word processing program to facilitate printing a document utilizing a particular printer associated with the driver component.

Figure 5:
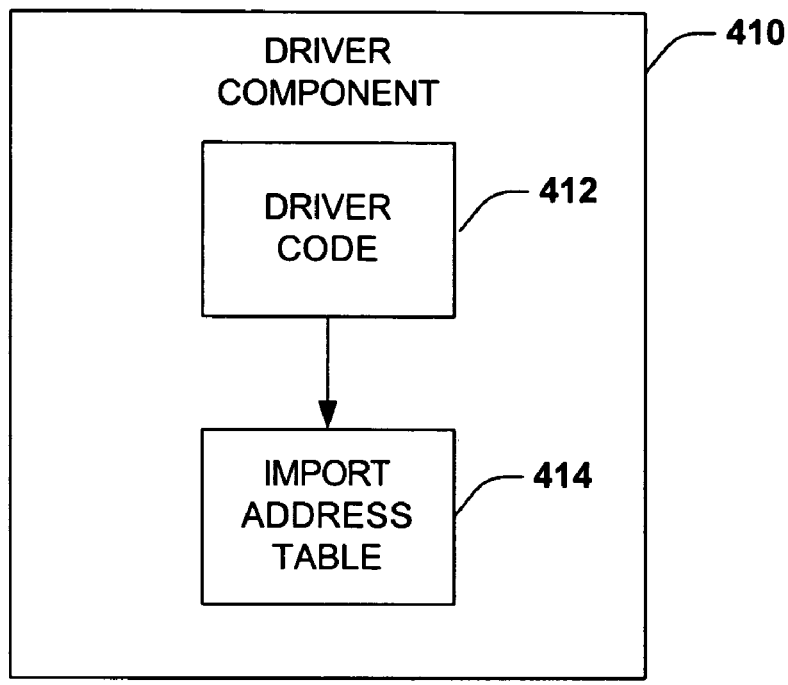
FIG. 5 is a block diagram of a driver component in accordance with an aspect of the subject invention.

Turning briefly to FIG. 5, a driver component 410 is illustrated in further detail in accordance with an aspect of the subject invention. Driver component 410 comprises driver code 412 and import address table 414. Driver code 412 corresponds to software specified procedures and functions that driver component 410 utilizes to implement driver functionality. Driver component 410 can enhance its utility while minimizing its overall size by using external services or procedures 422 (FIG. 4) provided by the kernel component. Driver component 410 accesses external procedures 422 by "importing" them using an import address table 414. When a driver component 410 is loaded or executed the procedures 422 listed in the import table can be bound to the drivers so that the driver can utilize the functions and procedures provided therein. This binding is referred to herein as driver linkage or import linkage.

It should be noted that while this detailed description focuses almost exclusively on drivers and driver components, the scope of the invention is not so limited. The scope of the present invention covers any applications or components, drivers or otherwise that are capable of being shimmed. While this description focuses on drivers and driver components, it is not meant to exclude all other software applications capable of being shimmed, but rather to facilitate a clear and understandable description of the invention devoid of confusing terms (e.g., client/application/component/driver).

Returning to FIG. 4, kernel component 420 is the nucleus or core of a computer operating system. An operating system is generally responsible for processing data and managing input and output. Kernel component 420, as part of the operating system, is loaded first and remains in main memory. In addition to being responsible for process management, file management, and memory management, inter alia, the kernel component 420 provides the essential services or procedures 422 required by applications and drivers. Procedures 422 can correspond to but are not limited to I/O scheduling, buffering, spooling, and error handling. Furthermore, it should be noted that the term kernel-mode service or kernel-mode procedure as used herein is intended to cover any service, procedure, driver, application or other component located in the kernel address space.

Shim component 430 provides additional functionality between driver component 410 and kernel services or procedures 422. According to one aspect of the subject invention such functionality can correspond to a fix for a faulty driver; however shim component 430 can also be utilized as a diagnostic shim to assist in root cause analysis. Faulty drivers can be the cause of many system crashes and other problems that contribute to a negative computer experience (e.g., delays, lockups . . . ) which are usually incorrectly attributed to an operating system. A shim component 420 provides a mechanism for fixing a driver's behavior by compensating for the drivers fault. Accordingly, the shim component 430 resides between one or more driver components 410 and a kernel component with desirable procedures 422. However, unlike conventional shimming systems the present invention also employs a context component 440.

Figure 6:
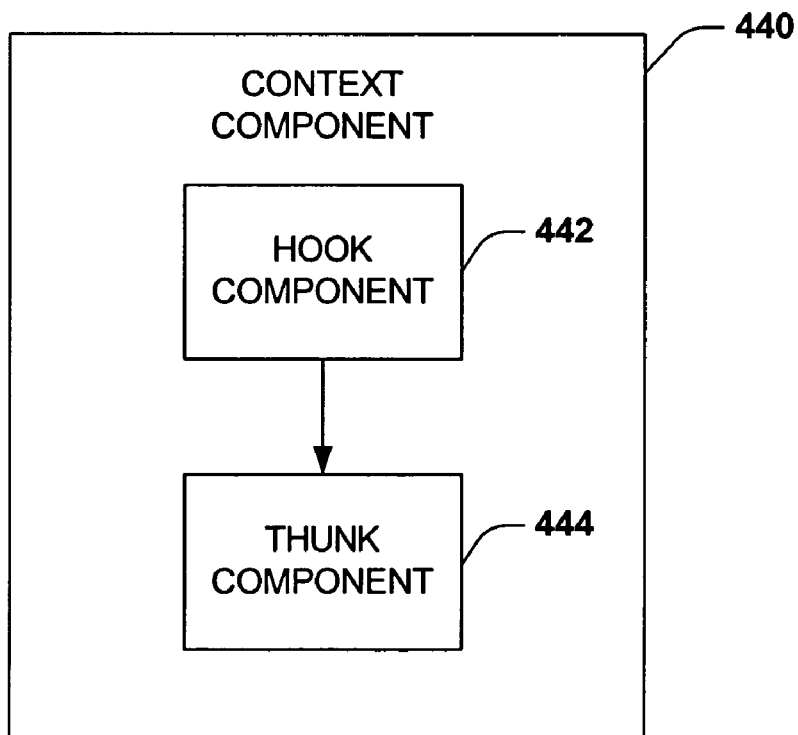
FIG. 6 is a block diagram of a context component in accordance with an aspect of the present invention.

Context component 440 is an intermediate component between a driver system call and a common shim component 430. Context component 440 provides a mechanism to establish and maintain unique per-driver linkage information. Conventional shimming systems do not establish a context for each driver calling a shim component, rather they retain only one linkage configuration embedded in the shim itself, specifically the linking configuration of the last driver shimmed. Therefore, all shim linkage configuration data related to a previously shimmed driver is lost. Turning to FIG. 6, a context component 440, in accordance with an aspect of the subject invention, is illustrated in further detail including hook component 442 and thunk component 444. Hook component 442 can be constructed during the loading of the subject driver. Hook component 442 retrieves contextual information from a driver to be shimmed (e.g., using a shim engine component described infra) and makes such information available to thunk component 444. In particular, hook component 442 can retrieve the address of the kernel procedure or service sought to be utilized by a driver from the driver's import address table (IAT). Furthermore, hook component 442 can determine the address of the shim to be utilized. This context data can then be stored in a data structure for later access by the thunk component 442 and the shim component 430. Thunk component 444 utilizes information retrieved by hook component 442 to change a driver's import address table to point to or reference the location of the shim rather than the originally specified service or procedure. Furthermore, thunk component 444 provides the shim component 430 with access to the context information related to the driver calling the shim component 430. The context information can be provided to the shim component 430 by passing such information or the location of the information as a procedure parameter or storing the data in a particular location known by the shim component 430. The shim component 430 can then utilize this information to retrieve the calling driver's originally referenced kernel procedure. Subsequently, the shim component 430 can chain forward to the originally reference procedure or service after providing additional functionality (e.g., driver fix).

Figure 7:
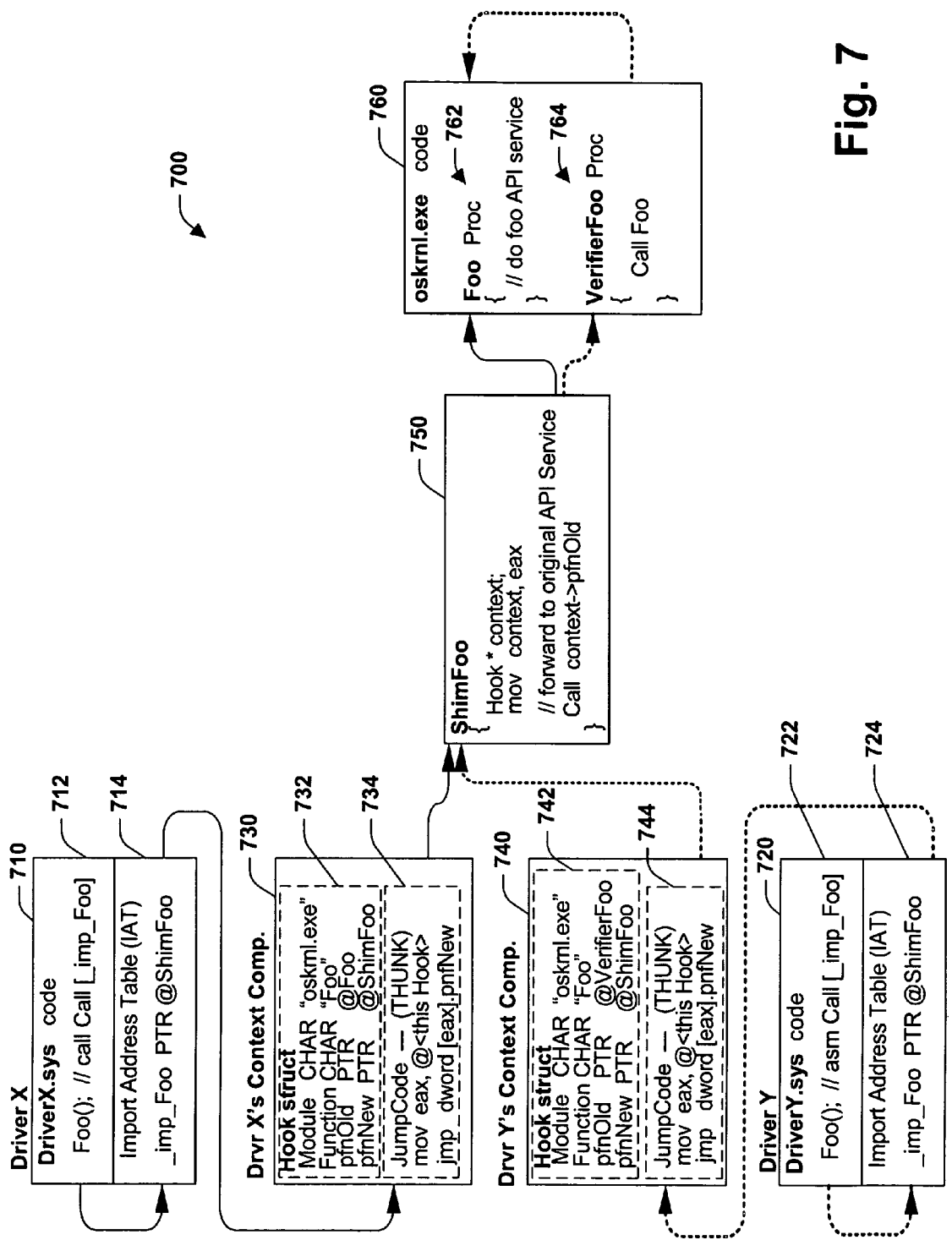
FIG. 7 is a block diagram illustrating an exemplary utilization of context components in accordance with an aspect of the subject invention.

Turning to FIG. 7, a block diagram of an exemplary system 700 in accordance with an aspect of the invention is illustrated. System 700 depicts the use of context components amongst two different driver components. Driver X 710 and driver Y 720 contain respective driver code 712 and 722 as well as import address tables 714 and 724. Furthermore, each driver is associated with a context component 730 and 740. A common shim component 750 is utilized to provide additional functionality between the drivers and kernel component procedures Foo 762 and VerifierFoo 764. Driver X 710 utilizes Foo procedure 762 in its code section 710. Accordingly, there is a pointer in driver X's import address table 714 pointing to the memory location containing kernel procedure 762. Here, however, a shim component 750 has been employed to provide additional functionality, for example compensating for a problem with driver X 710. In accordance with an aspect of the subject invention a context component 730 is also employed to provide driver specific context information to the shim component 750. Context component 730 includes a hook component 732 and a thunk component 734. Hook component 732 changes the pointer in import address table 714 originally referencing Foo to point or link driver X's import of the Foo procedure to context component 730. Additionally, context component 730 receives the memory address of the shim component 750 and stores, inter alia, a pointer to the shim component 750 and a pointer to the originally referenced kernel procedure Foo 762 in a data structure, here Hook struct. Thus, hook struct contains the driver context information. Thunk component 734 utilizes this information to jump to the shim component 750 and provide shim component 750 with context data. After the jump is complete, shim component 750 executes its function and then utilizes the context data to link and ultimately execute the original procedure call Foo 762.

Driver Y 720 goes through a similar process with the common shim component 750. In this case, however, driver Y 720 utilizes its own context component 740 and a different procedure call. Driver Y 720 ultimately seeks to call Foo procedure 762, but as shown here after calling VerifierFoo procedure 764. The hook component 742 of the driver context component 740 determines and saves information related to the procedure called by the shim component 750. Thunk component 744 links the driver to the shim component 750 by changing the reference address in driver Y's import address table 724. Thereafter, when driver Y 720 calls the Foo procedure in its code section 722 control is transferred to the context component 740. Context component then stores the stores a pointer to the context information in a register or by alternative means transfers the location of the context information or the context information itself to shim component 750. Shim component 750 then executes its functionality and then using the context information jumps to the verifier procedure 764, which executes and jumps to the Foo procedure 762 that is associated with an oskrnl.exe code at 760. It should be noted that by retrieving and maintaining context data for each driver, the subject invention ensures that context data for previously shimmed drivers is not lost upon the utilization or calling of the shim by another driver. Conventional shimming practices would have lost information regarding the context of the driver X 710 upon execution of driver Y 720. In this case, if driver X 710 was called again after driver Y 720, a conventional shim would not know which procedure driver X 710 originally referenced as context data would not have been retained and the reference in the drivers import address table would have been changed to reference the shim component 750. The present invention eliminates this problem by storing unique context information for each driver component.

Figure 8:
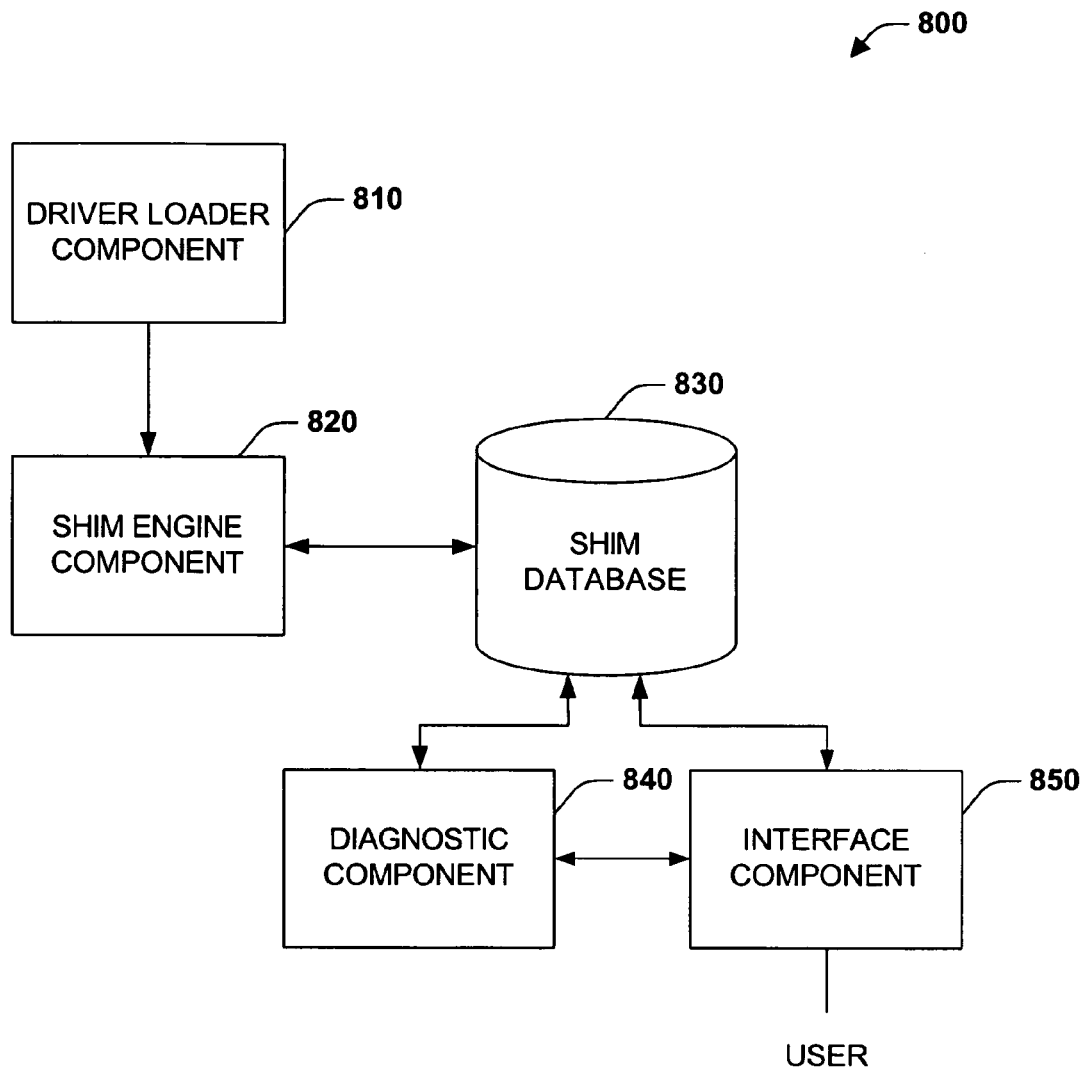
FIG. 8 is a block diagram of depicting a system for kernel-mode driver shimming in accordance with an aspect of the present invention.

FIG. 8 depicts a system 800 for utilizing shims in accordance with an aspect of the subject invention. System 800 comprises driver loader component 810, shim engine component 820, shim database 830, diagnostic component 840, and interface component 850. Driver loader component 810 receives a signal from an entity (e.g., person, application, device, plug-and-play component . . . ) to load a driver. Driver loader component 810 establishes driver initial linkage and loads a target driver into memory for execution. The loader component 810 can resolve any unresolved dynamic references the driver may have for external APIs or processes and when all references are resolved generate a notification signal. The notification signal provides, among other things, the identity of the driver being loaded to the shim engine component 820. Such notification signaling allows other services to receive control during the driver load procedure just prior to the driver being called. The shim engine component receives the notification signal and utilizes the information contained therein to query the shim database 830 to determine if the target driver is to be shimmed. The shim database 830 acts as a central repository for the data concerning which drivers need to be shimmed and which shim components are to be applied to particular drivers. If the shim engine component 820 determines, utilizing at least the shim database 830, that a driver should be shimmed, the shim engine component identifies the set of shims or shim package to be applied, loads them (if not already loaded), and allows the shims to initialize a unique context. Subsequently, the shim engine component 820 can redirect the target driver API imports to one or more shim components.

System 800 can also include a diagnostic component 840 that analyzes a computer system and initiates corrective action. According to one aspect of the subject invention the diagnostic component 840 assists in root cause analysis of a system crash. The diagnostic component can therefore employ a variety of methods of analyzing system dump information and/or a program trace (e.g., utilizing expert systems, neural networks . . . ) to determine the cause of the crash. However, diagnostic component 840 need not wait for a system crash. The diagnostic component 840 can also be proactive and engage in system analysis to detect system instabilities and/or inefficiencies. Upon determining the cause of a crash or detecting system instabilities and/or inefficiencies, corrective action can be initiated by the diagnostic component 840. Such corrective action can include providing notification to a user or operator via interface 850. Corrective action can also comprise searching the shim database 830 to determine whether a shim component already exists that if applied can fix the detected problem, instability or inefficiency. Such a determination can be made intelligently using Bayesian networks, neural networks, decision trees, support vector machines, linear and non-linear regression and/or other learning models. According to an aspect of the invention, the diagnostic component can engage in a probabilistic analysis based on the cost of making an incorrect diagnosis and/or selecting the wrong shim weighed against the benefit of correction. Confidence levels may be employed and specified by a developer or user to control actions of the diagnostic component.

Interface component 850 enables a user to interact with the shim database 830. According to one aspect of the invention, the interface component 850 is a graphical user interface (GUI) that facilitates creation of a shim component or shim package for a driver and storage of the shim component or shim package to shim database 830. For example, the interface component 850 can be a wizard that presents a user with a series of steps in graphical windows that aids in the generation of a shim component to remedy a detected problem, instability, or inefficiency. The interface component 850 can also provide a developer or user a means for developing and deploying a diagnostic shim component that can assist in understanding an operation sequence to determine or converge upon a problem.

Figure 9:
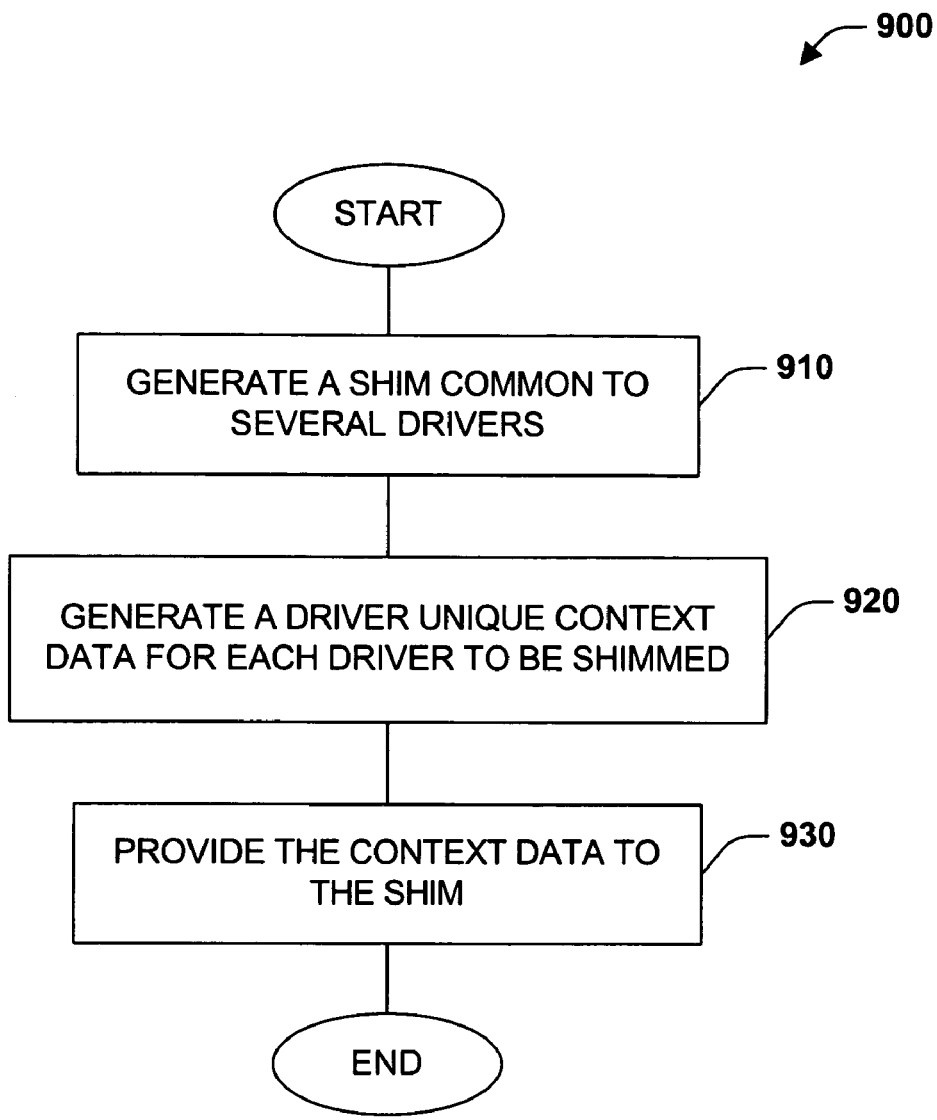
FIG. 9 is a flow chart diagram illustrating a method of shimming kernel-mode drivers in accordance with an aspect of the subject invention.
Figure 10:
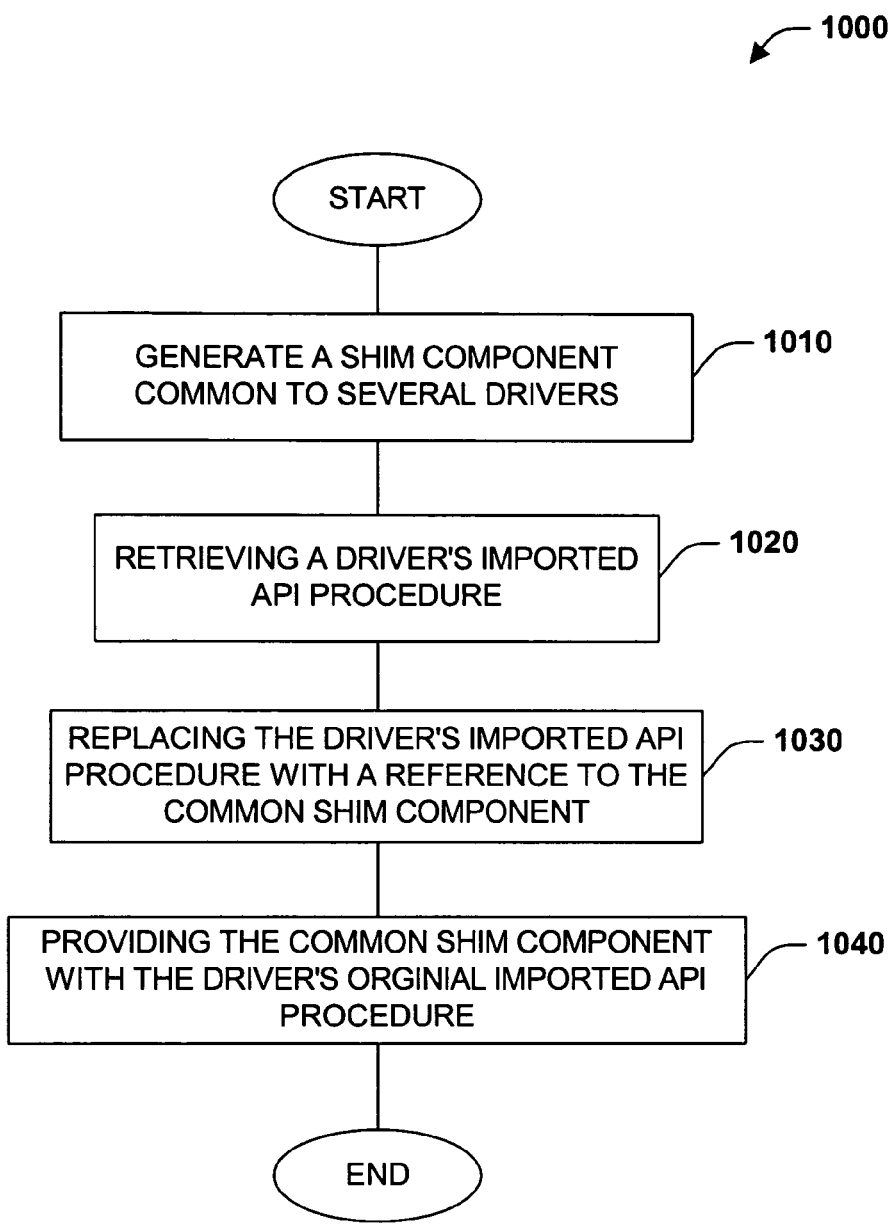
FIG. 10 is a flow chart diagram depicting a method of shimming kernel-mode drivers in accordance with an aspect of the subject invention.
Figure 11:
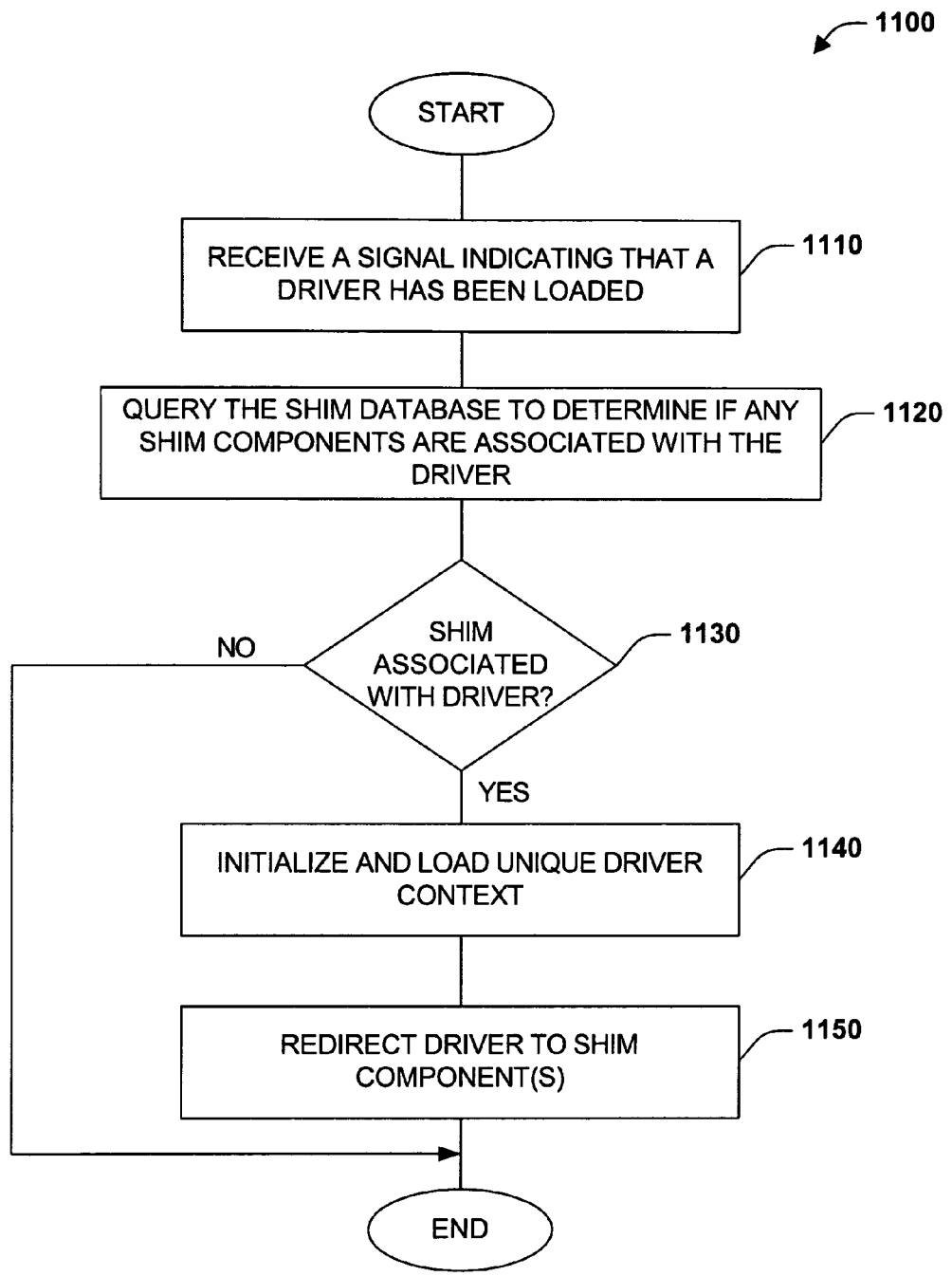
FIG. 11 is a flow chart diagram illustrating a methodology for shimming kernel-mode drivers in accordance with an aspect of the present invention.

In view of the exemplary systems described supra, a methodology that may be implemented in accordance with the present invention will be better appreciated with reference to the flow charts of FIGS. 9-11. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Turning to FIG. 9, a methodology 900 for shimming kernel mode drivers is depicted in accordance with an aspect of the present invention. At 910, a shim component common to several drivers is generated. A common shim component provides an efficient mechanism to add functionality to one or more drivers so as to compensate for a fault associated with the one or more drivers, for example. A shim component can be generated using a program editor and/or a graphical user interface. Alternatively, a shim component can be generated using a wizard that guides a user or developer through a series of steps associated with generating a shim component utilizing a myriad of windows and graphical interface components such as buttons, scroll bars, text boxes and the like. At 920, driver unique context data is generated for each driver to be shimmed. Subsequently, the driver unique context is provided to the common shim at 930. The unique context data allows the common shim component to identify the driver that is utilizing the shim component. This enables the shim component to add additional functionality and then chain forward to the kernel-mode service or procedure utilized by the driver and therefore leaves a driver's chain of execution intact.

FIG. 10 is a flow chart diagram illustrating a methodology 1000 for shimming kernel mode drivers in accordance with an aspect of the subject invention. At 1010, a shim component common to a plurality of drivers is generated. As mentioned supra, the shim component provides an efficient mechanism to add functionality to a driver for instance to compensate for some fault (e.g., referencing restricted memory . . . ). However, it should also be noted that a shim component can be utilized as a tool to determine and pinpoint system problems. The shim component can be generated using one of several methods, components, and devices, for example using a GUI or a wizard. At 1020, a driver's imported API or kernel-mode service is retrieved from the drivers import address table. Subsequently, the drivers API service reference in its import address table is replaced with a pointer to the shim component at 1030. The replaced API or kernel kernel-mode service is then provided to the shim at 1040. This context information can be provided to the shim component by employing it as a parameter in a function or procedure calling the shim, by loading it to a particular memory location, and the like. Accordingly, a driver associated with a common shim component becomes linked to the shim component, which is then able to chain forward to the API or kernel-mode service after the shim component executes its additional added functionality.

FIG. 11 depicts a method 1100 of modifying kernel mode drivers in accordance with an aspect of the subject invention. At 1110, a signal is received indicating that a driver has been loaded. In accordance with one aspect of the invention, the signal can be generated by a driver loader component after resolving any unresolved dynamic references the driver may have for external APIs. Such notification allows other services to receive control just prior to the driver's driver entry being called. At 1120, a query is performed on the shim database to determine if a driver is one that is to be shimmed. A determination is then made at 1130 as to whether the driver is to be shimmed based on the existence or nonexistence of shim components associated with the driver. If there are no shims associated with the driver then the procedure is terminated. If, however, there is one or more shims associated with the driver then the process proceeds to 1140 where a unique driver context is initialized and loaded. Subsequently, the driver is redirected to the shim component rather than a driver import entry such as a kernel-mode service or procedure at 1150. Such redirection can be accomplished by replacing an entry in the driver's import address table with a pointer to the shim component. Thereafter, the shim component can but is not required to utilize the unique driver context to chain forward to the replaced driver import entry.

Figure 12:
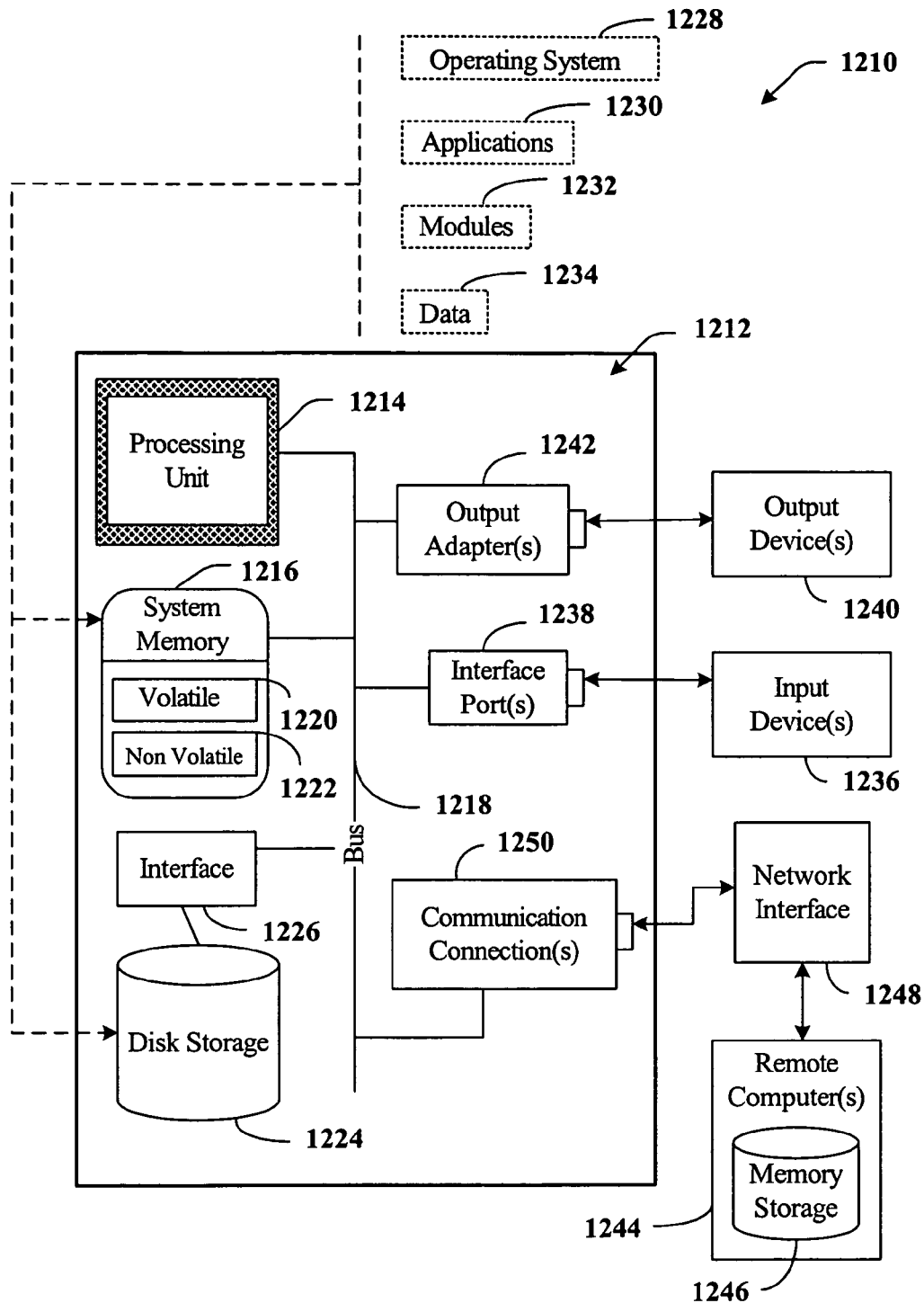
FIG. 12 is a schematic block diagram illustrating a suitable operating environment in accordance with an aspect of the present invention.

In order to provide a context for the various aspects of the invention, FIG. 12 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for kernel-mode shimming comprising:
- a processing unit;
- a memory;
- a plurality of driver components;
- a common shim component that provides added functionality to the plurality of driver components;
- a context component associated with each driver component that retrieves and maintains driver context information;
- a thunk component that replaces at least one address associated with a kernel-mode service in a driver component's import address table with an address of the context component so as to redirect flow of execution from the kernel-mode service to the context component, wherein the thunk component links the context component to the common shim component; and
- a diagnostic component that can engage in a probabilistic analysis based on cost of making an incorrect diagnosis and selecting a wrong shim weighed against benefit of correction.

2. The system of claim 1, wherein driver context information includes a driver's linkage configuration.

3. The system of claim 2, wherein the context component comprises a hook component that retrieves an address associated with a kernel-mode service from the driver component's import address table.

4. The system of claim 3, wherein the hook component determines the address of the context component.

5. The system of claim 1, wherein the thunk component provides the common shim component with context information regarding the kernel-mode service replaced by the context component.

6. The system of claim 5, wherein the common shim component provides a link to the kernel-mode service to direct flow of execution from the shim component to the service.

7. The system of claim 1, wherein the added functionality provided by the common shim component includes compensating for a driver fault.

8. A system for shimming kernel-mode drivers comprising:
- a processing unit;
- a memory;
- a driver loader component that loads drivers and generates a notification signal to indicate that a particular driver has been loaded;
- a shim database that stores shim components, identify drivers to be shimmed, and associates one or more shim components with drivers to be shimmed;
- a shim engine component that receives a notification signal from the driver loader component, queries the shim database to determine if the particular loaded driver needs to be shimmed, and loads shim components associated with the driver, wherein the shim engine generates a context component associated with a particular loaded driver, the context component comprising:
  - a data structure identifying a kernel-made procedure utilized by the loaded driver; and
  - a thunk component for linking the loaded driver to the context component and the context component to a shim component; and a diagnostic component for determining cause of a system problem, instability or inefficiency and initiating corrective action.

9. The system of claim 8, wherein the shim engine is kernel-mode service.

10. The system of claim 8, wherein the corrective action includes locating and applying one or more shim components stored in the shim database to a driver.

11. The system of claim 8, wherein the corrective action includes notifying a user.

12. The system of claim 8, further comprising an interface component to facilitate development and deployment of a remedial shim component.

13. The system of claim 12, wherein the interface component includes a shim wizard that navigates a user through a series of steps to develop a shim component or apply a previously developed shim component to a driver.

14. A system for shimming kernel-mode drivers comprising:
  a processing unit;
  a memory;
  a multitude of driver components;
  a shim component common to the multitude of driver components;
  a means for providing driver unique context data to the shim component such that a shim component can identify its caller in an overall driver linkage configuration;
  a thunk component that replaces at least one address associated with a kernel-mode service in a driver component's import address table with the address of the means for providing driver unique context data so as to redirect flow of execution from the kernel-mode service to the means for providing driver unique context data, wherein the thunk component links the means for providing driver unique context data to the common shim component; and
  a diagnostic component that can engage in a probabilistic analysis based on cost of making an incorrect diagnosis and selecting a wrong shim weighed against benefit of correction.

15. The system of claim 14, wherein the context data includes information regarding a kernel-mode procedure utilized by a driver component.

16. A method for shimming a kernel-mode driver comprising:
  generating a shim component common to several driven;
  generating driver unique context data associated with each driver to be shimmed;
  replacing at least one address associated with a kernel-mode service in a driver component's import address table with an address of a context component so as to redirect flow of execution from the kernel-mode service, wherein a thunk component replaces the at least one address and links the context component to the shim component; and
  providing the driver unique context data to the shim component such that the shim component can determine its caller in an overall driver linkage configuration, and engaging in a probabilistic analysis based on cost of making an incorrect diagnosis and selecting a wrong shim weighed against benefit of correction.

17. The method of claim 14, wherein the caller is a driver.

18. The method of claim 16, wherein providing context data to the shim component includes passing the context data via a procedure or method parameter.

19. The method of claim 15, wherein providing context data to the shim component includes loading the driver unique context data into memory.

20. The method of claim 15, further comprising storing the shim component and driver unique context data in a shim database in a manner that preserves association between a shim component, context data, and a driver.

21. A method for modifying kernel-mode drivers calls comprising:
  receiving a signal indicating that a driver has been loaded;
  querying a shim database to determine if the loaded driver has shim components associated therewith;
  loading any shim components associated with the loaded driver;
  initializing a unique context for the loaded driver;
  replacing at least one address associated with a kernel-mode service in a driver component's import address table with an address of a context component so as to redirect flow of execution from the kernel-mode service, wherein a thunk component replaces the at least one address and links the context component to a shim component; and
  redirecting the loaded driver to the shim component, wherein the unique context identifies the loaded driver to the shim component, and engaging in a probabilistic analysis based on cost of making an incorrect diagnosis and selecting a wrong shim weighed against benefit of correction.

22. The method of claim 21, wherein redirecting the loaded driver to the shim component comprises replacing a driver import address table entry specifying a kernel-mode procedure to be imported with a pointer to the shim component.

23. The method of claim 22, further comprising calling the kernel-mode procedure replaced by the pointer to the shim component from the shim component.

* * * * *